United States Patent
Kim

(10) Patent No.: US 9,698,612 B2
(45) Date of Patent: Jul. 4, 2017

(54) RECHARGEABLE BATTERY PROTECTION APPARATUS

(71) Applicant: SAMSUNG SDI CO., LTD., Yongin-si, Gyeonggi-do (KR)

(72) Inventor: Duk-Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 124 days.

(21) Appl. No.: 14/618,917

(22) Filed: Feb. 10, 2015

(65) Prior Publication Data
US 2015/0288202 A1 Oct. 8, 2015

(30) Foreign Application Priority Data
Apr. 7, 2014 (KR) .................. 10-2014-0041288

(51) Int. Cl.
*H02J 7/00* (2006.01)
*B60L 3/04* (2006.01)
(Continued)

(52) U.S. Cl.
CPC .......... *H02J 7/0031* (2013.01); *B60L 3/0046* (2013.01); *B60L 3/04* (2013.01); *B60L 11/1861* (2013.01); *B60L 11/1879* (2013.01); *H01M 2/345* (2013.01); *H01M 10/0525* (2013.01); *H01M 2200/103* (2013.01); *H02J 2007/0037* (2013.01); *Y02E 60/122* (2013.01);
(Continued)

(58) Field of Classification Search
USPC ........................................................ 320/116
See application file for complete search history.

(56) References Cited

U.S. PATENT DOCUMENTS

2007/0054157 A1  3/2007 Ryu et al.
2010/0201321 A1* 8/2010 Asakura ............... G01R 31/025
                                                      320/132
(Continued)

FOREIGN PATENT DOCUMENTS

EP   2 448 081 A2   5/2012
EP   2 672 548 A1   12/2013
(Continued)

OTHER PUBLICATIONS

English machine translation of Japanese Publication No. JP 08-140206, dated May 31, 1996, 13 pages.
(Continued)

*Primary Examiner* — Samuel Berhanu
(74) *Attorney, Agent, or Firm* — Lewis Roca Rothgerber Christie LLP

(57) ABSTRACT

A rechargeable battery protection apparatus includes: a battery module including a plurality of unit cells coupled in series between a positive terminal and a negative terminal, and configured to be coupled to a charger through a first external port coupled to the positive terminal and a second external port coupled to the negative terminal to charge the plurality of unit cells; a pack fuse on a high current path between the battery module and the charger; and a connector that forms a bypass path that bypasses a current between a first unit cell and a second unit cell among the plurality of unit cells to the pack fuse depending on an internal pressure of the battery module.

7 Claims, 5 Drawing Sheets

(51) Int. Cl.
*H01M 2/34* (2006.01)
*B60L 3/00* (2006.01)
*B60L 11/18* (2006.01)
*H01M 10/0525* (2010.01)

(52) U.S. Cl.
CPC .......... *Y02T 10/7005* (2013.01); *Y02T 10/705* (2013.01); *Y02T 10/7044* (2013.01)

(56) References Cited

U.S. PATENT DOCUMENTS

| | | | |
|---|---|---|---|
| 2013/0193927 A1* | 8/2013 | Schaefer | H01M 10/48 320/128 |
| 2014/0167655 A1 | 6/2014 | Chatroux et al. | |
| 2014/0300180 A1 | 10/2014 | Iwashita et al. | |

FOREIGN PATENT DOCUMENTS

| | | |
|---|---|---|
| JP | 08-140206 | 5/1996 |
| KR | 10-2003-0092391 | 12/2003 |
| KR | 10-2013-0066039 | 6/2013 |
| WO | WO 2012/171917 A1 | 12/2012 |
| WO | WO 2013/084665 A1 | 6/2013 |

OTHER PUBLICATIONS

EPO Search Report dated Jul. 6, 2015, for corresponding European Patent application 15159779.6, (3 pages).

\* cited by examiner

RECHARGEABLE BATTERY PROTECTION APPARATUS

CROSS-REFERENCE TO RELATED APPLICATION

This application claims priority to and the benefit of Korean Patent Application No. 10-2014-0041288 filed in the Korean Intellectual Property Office on Apr. 7, 2014, the entire content of which is incorporated herein by reference.

BACKGROUND

1. Field

An embodiment of the present invention relates to a rechargeable battery protection apparatus. For example, embodiments of the present invention relate to a rechargeable battery protection apparatus for preventing or reducing abnormal overcharge.

2. Description of the Related Art

In general, a rechargeable battery is capable of being repeatedly charged and discharged. Examples of a rechargeable battery include, but are not limited to, a nickel-metal hydride (Ni-MH) battery, a lithium (Li) ion battery, etc.

The rechargeable battery is used as a power source for a mobile device, an electric vehicle, a hybrid vehicle, an electrical device, etc., and can be used in various ways depending on device types to which it is applied.

A low-capacity rechargeable battery is used in small portable electronic devices such as, but not limited to, mobile phones, notebook computers, and camcorders, while a high-capacity rechargeable battery is widely used as a power source for driving a motor of a hybrid vehicle, etc., but rechargeable batteries are not limited thereto.

The rechargeable battery may be used in small electronic devices as a single cell battery or in motor-driving power sources, etc., as a pack in which a plurality of cells are electrically coupled or connected.

When such a rechargeable battery is abnormally overcharged, an increased voltage inside of the rechargeable battery generates gas. The generated gas increases internal pressure, such that a case of the rechargeable battery may expand and explode.

The above information disclosed in this Background section is only for enhancement of understanding of the background of the invention and therefore it may contain information that does not form the prior art that is already known in this country to a person of ordinary skill in the art.

SUMMARY

An exemplary embodiment provides a rechargeable battery protection apparatus for protecting against abnormal overcharge of a rechargeable battery.

A rechargeable battery protection apparatus according to an exemplary embodiment includes: a battery module including a plurality of unit cells coupled in series between a positive terminal and a negative terminal, and configured to be coupled to a charger through a first external port coupled to the positive terminal and a second external port coupled to the negative terminal to charge the plurality of unit cells; a pack fuse on a high current path between the battery module and the charger; and a connector that forms a bypass path that bypasses a current between a first unit cell and a second unit cell among the plurality of unit cells to the pack fuse depending on an internal pressure of the battery module.

The connector may be physically deformed depending on the internal pressure of the battery module to form an electrical connection between each of the first and second unit cells and the pack fuse.

The connector may include a first connector that is on the first unit cell and is configured to electrically couple the first unit cell and one end of the pack fuse depending on an internal pressure of the first unit cell, and a second connector that is on the second unit cell and is configured to electrically couple the other end of the pack fuse and the second unit cell depending on an internal pressure of the second unit cell.

Each of the plurality of unit cells may include an electrode assembly including positive and negative electrode plates, and a case for accommodating the electrode assembly.

The first unit cell may include a connecting tab for electrically coupling the case of the first unit cell and the positive terminal, and the second unit cell may include a connecting tab for electrically coupling the case of the second unit cell and a positive terminal of the second unit cell.

Each of the first and second connectors may include a first short-circuit plate that extends convexly toward the inside of the respective case, and a second short-circuit plate that is on the first short-circuit plate and is spaced apart from the first short-circuit plate.

The first short-circuit plate may be deformed depending on the internal pressure to electrically contact the second short-circuit plate.

The pack fuse may be between the positive terminal and the first external port.

The exemplary embodiment uses the element that is deformed by the internal pressure when the rechargeable battery is abnormally overcharged and bypasses the current between the unit cell at the highest voltage side and the unit cell at the lowest voltage side so as to melt and cut off (e.g., disconnect) the pack fuse, thereby physically cutting off (e.g., disconnecting) the current supplied from the charger.

In addition, in the exemplary embodiment, the element for reducing or preventing abnormal overcharge is provided per battery module and thus the element is not required to be included in every cell, thereby securing a design margin and robustness.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

Figure 1:
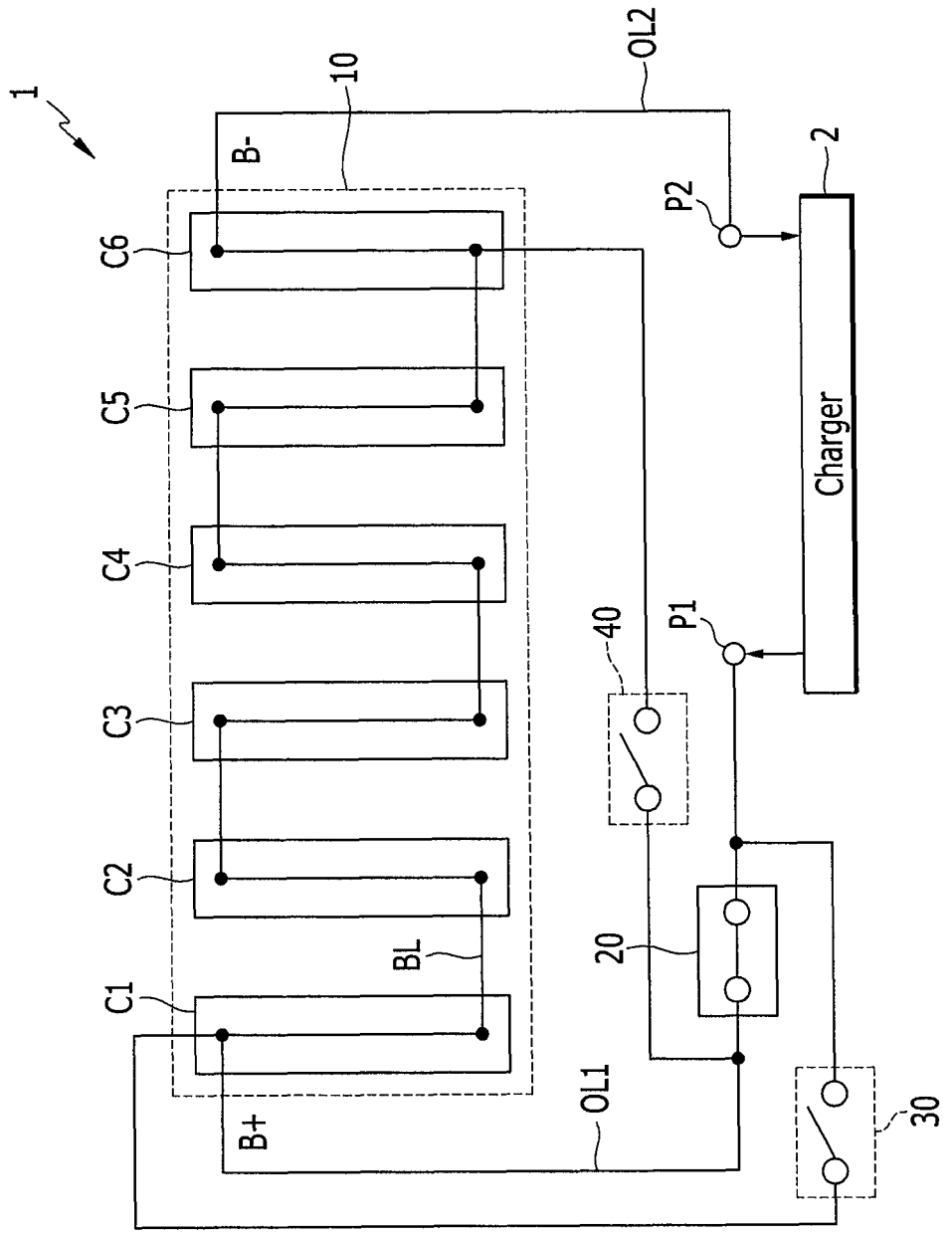
FIG. 1 is a circuit diagram of a rechargeable battery protection apparatus according to an exemplary embodiment.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive.

Like reference numerals designate like elements throughout the specification.

Throughout this specification and the claims that follow, when an element is "coupled to" or "connected to" another element, the element may be directly coupled to or connected to the other element or may be electrically or indirectly coupled to or connected to the other element through a third element. Also, in the context of the present application, when a first element is referred to as being "on" a second element, the first element may be directly on the second element or may be indirectly on the second element with one or more intervening elements interposed therebetween. Further, as used herein, terms such as "above" and "on" are used in a relative sense and, therefore, should not be construed as limiting, as an element that is above another element may instead be below the other element, depending upon the point of view.

In addition, unless explicitly described to the contrary, the word "comprise" and variations such as "comprises" or "comprising" will be understood to imply the inclusion of stated elements but not the exclusion of any other elements.

The present invention will be described more fully hereinafter with reference to the accompanying drawings, in which exemplary embodiments of the invention may be easily embodied by those skilled in the art.

FIG. 1 is a circuit diagram of a rechargeable battery protection apparatus according to an exemplary embodiment.

Referring to FIG. 1, the rechargeable battery protection apparatus 1 according to the exemplary embodiment includes a battery module 10, a pack fuse 20, and first and second connectors 30 and 40.

A positive terminal B+ and a negative terminal B− are coupled to or connected to a charger 2 through external power lines OL1 and OL2, respectively, and external ports P1 and P2, respectively, to charge the battery module 10.

In addition, the battery module 10 is coupled to or connected to an external load through the external ports P1 and P2 (e.g., the first external port P1 and the second external port P2) to discharge the battery module 10.

The battery module 10 according to the exemplary embodiment can be applicable to, for example, a vehicle, an electric bike, etc., but the present invention is not limited thereto.

The battery module 10 includes first to sixth unit cells C1 to C6.

The first to sixth unit cells C1 to C6 are coupled to or connected to each other (e.g., by way of connections BL, which may be bus bars) in series between the positive and negative terminals B+ and B−.

The number of unit cells of the battery module 10 is six in FIGS. 1, 2, 4, and 5, but the exemplary embodiment is not limited thereto. For example, embodiments of the battery module may include fewer than six unit cells, or more than six unit cells.

The pack fuse 20 is on or formed on a high current path between the battery module 10 and the charger 2.

The pack fuse 20 is melted to cut off (e.g., disconnect) the high current path if current between the battery module 10 and the charger 2 exceeds a predetermined or set level.

In some embodiments, the pack fuse 20 includes one end coupled to or connected to a positive terminal of the first unit cell C1, and the other end coupled to or connected to the external port P1.

The pack fuse 20 according to the exemplary embodiment may be melted to cut off (e.g., disconnect) the high current path if a short-circuit current flows through the first and second connectors 30 and 40 when the battery module 10 is abnormally overcharged.

The first connector 30 is between or formed between the positive terminal of the first unit cell C1 of the first to sixth unit cells C1 to C6 and the other end of the pack fuse 20.

In some embodiments, the first connector 30 is physically deformed to form an electrically conductive wire or an electrical connection when the battery module 10 is abnormally overcharged and the internal pressure of the battery module increases (e.g., increases above a set a pressure). For example, when an internal pressure of a unit cell of the first to sixth unit cells C1 to C6 increases above a set pressure (e.g., when the battery module 10 is abnormally overcharged), the first connector 30 may physically deform to form an electrical connection to prevent or reduce further abnormal overcharging of the battery module.

The second connector 40 is between or formed between a positive terminal of the sixth unit cell C6 of the first to sixth unit cells C1 to C6 and the one end of the pack fuse 20.

In some embodiments, the second connector 40 is physically deformed to form an electrically conductive wire when the battery module 10 is abnormally overcharged and internal pressure of the battery module increases (e.g., increase above a set pressure). For example, when an internal pressure of a unit cell of the first to sixth unit cells C1 to C6 increases above a set pressure (e.g., when the battery module 10 is abnormally overcharged), the second connector 40 may physically deform to form an electrical connection to prevent or reduce further abnormal overcharging of the battery module.

A configuration in which the first and second connectors 30 and 40 are respectively coupled to or connected to the positive terminals of the unit cells C1 and C6 at the highest and lowest voltage sides among the first to sixth unit cells C1 to C6, is exemplarily described, but the present invention is not limited thereto, and positions of the first and second connectors 30 and 40 may be changed depending on an amount of the short-circuit current that causes the pack fuse 20 to be melted and cut off (e.g., disconnected).

Figure 2:
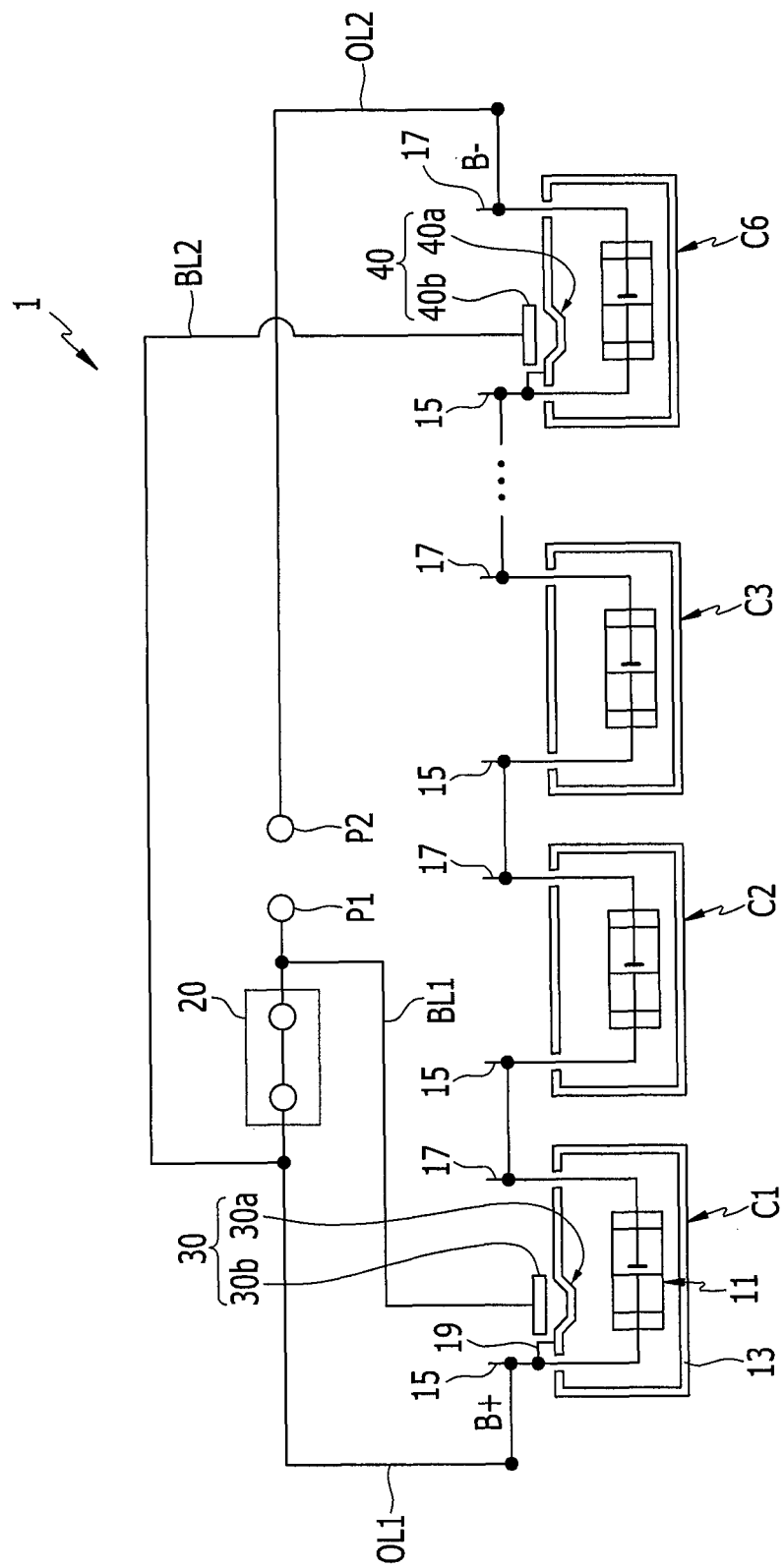
FIG. 2 is a schematic view showing a configuration of the rechargeable battery protection apparatus according to the exemplary embodiment of FIG. 1.

FIG. 2 is a schematic view showing a configuration of the rechargeable battery protection apparatus according to the exemplary embodiment of FIG. 1.

Referring to FIG. 2, the rechargeable battery protection apparatus 1 according to the exemplary embodiment includes the battery module 10, the pack fuse 20, and the first and second connectors 30 and 40.

The battery module 10 of FIG. 2 includes the first to sixth unit cells C1 to C6 arranged along or in one direction at a fixed or set interval, but the present invention is not limited thereto.

In this embodiment, each of the first to sixth unit cells C1 to C6 includes an electrode assembly 11, a case 13, a positive terminal 15, and a negative terminal 17.

In this embodiment, each of the first to sixth unit cells C1 to C6 is exemplarily shown or described as a prismatic lithium ion rechargeable battery.

The exemplary embodiment is not limited thereto, but instead can include various types (or kinds) of batteries, such as a lithium polymer battery or a cylindrical battery. The unit cells can have any suitable shape available for rechargeable batteries.

The electrode assembly 11 includes a structure in which negative and positive electrode plates have a separator interposed therebetween such that the negative and positive electrode plates are at or disposed at opposite sides of the separator. For example, the separator may be between the negative and positive electrode plates, which may face one another.

The case 13 may accommodate the electrode assembly 11, and may include or be formed of a metal such as aluminum, stainless steel, etc., but the case is not limited thereto.

The positive and negative terminals 15 and 17 may respectively have or be formed in a bolt-like shape having a thread at an external circumferential surface thereof.

The positive terminals 15 of the second to sixth unit cells C2 to C6 are respectively coupled to or connected to the negative terminals 17 of the adjacent first to fifth unit cells C1 to C5.

In this embodiment, the positive terminal 15 of the first unit cell C1 is electrically coupled to or connected to the positive terminal B+ of the battery module 10, and the negative terminal 17 of the sixth unit cell C6 is electrically coupled to or connected to the negative terminal B− of the battery module 10.

The first connector 30 is above or disposed above the first unit cell C1, and includes a first short-circuit plate 30a and a second short-circuit plate 30b.

In this embodiment, the first short-circuit plate 30a extends convexly or is convexly formed toward the inside of the case 13, and is deformed by internal pressure of the first unit cell C1 to physically contact or electrically contact the second short-circuit plate 30b.

The first short-circuit plate 30a is electrically coupled to or connected to the positive terminal 15 of the first unit cell C1 through a connecting tab 19.

The connecting tab 19 extends or is extendedly formed from the positive terminal 15 of the first unit cell C1, but a shape of the connecting tab 19 is not limited thereto.

The second short-circuit plate 30b faces or is disposed to face the first short-circuit plate 30a, and is spaced apart or formed to be spaced apart from the first short-circuit plate 30a by a fixed interval.

The second short-circuit plate 30b is electrically coupled to or connected to the other end of the pack fuse 20 through a wire BL1.

The second connector 40 is above or disposed above the sixth unit cell C6, and includes a first short-circuit plate 40a and a second short-circuit plate 40b.

In this embodiment, the first short-circuit plate 40a extends convexly or is convexly formed toward the inside of the case 13, and is deformed by internal pressure of the sixth unit cell C6 to physically contact or electrically contact the second short-circuit plate 40b.

The first short-circuit plate 40a is electrically coupled to or connected to the positive terminal 15 of the sixth unit cell C6 through a connecting tab 21.

The connecting tab 21 may extend or be extendedly formed from the positive terminal 15 of the sixth unit cell C6, but a shape of the connecting tab 21 is not limited thereto.

The second short-circuit plate 40b faces or is disposed to face the first short-circuit plate 40a, and is spaced apart or formed to be spaced apart from the first short-circuit plate 40a by a fixed interval.

The second short-circuit plate 40b is electrically coupled to or connected to the one end of the pack fuse 20 through a wire BL2.

In the exemplary embodiment, a configuration in which the second short-circuit plates 30b and 40b of the first and second connectors 30 and 40 are above or disposed above the respective cases 13 of the first and sixth unit cells C1 and C6 is exemplarily described. However, the exemplary embodiment is not limited thereto, and a configuration in which each of the second short-circuit plates 30b and 40b of the first and second connectors 30 and 40 is above or disposed above a case of the battery module 10 is also embodied.

Figure 3:
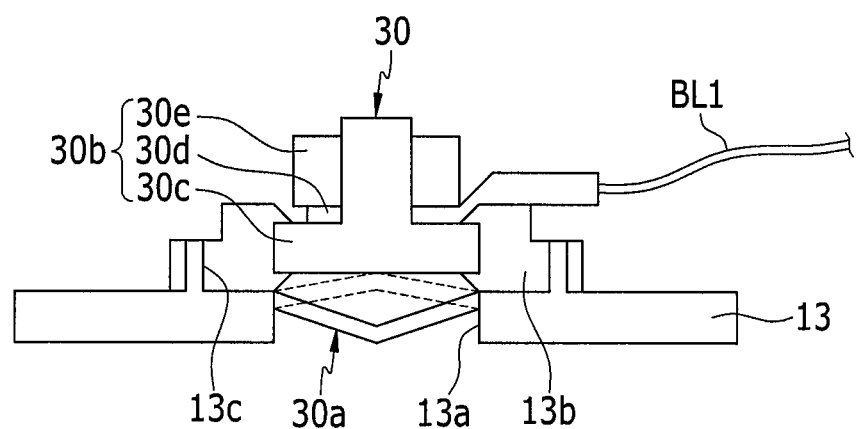
FIG. 3 is a schematic view showing a detailed configuration of a first connector illustrated in FIG. 2.

FIG. 3 is a drawing showing a configuration of an embodiment of the first connector 30 illustrated in FIG. 2.

Referring to FIG. 3, the first connector 30 according to an exemplary embodiment includes the first and second short-circuit plates 30a and 30b.

In some embodiments, the first short-circuit plate 30a is above or formed above a short-circuit hole 13a of the case 13.

The first short-circuit plate 30a may be integrally formed with the case 13.

In some embodiments, the second short-circuit plate 30b is spaced apart or disposed to be spaced apart from the first short-circuit plate 30a above the shot-circuit hole 13a of the case 13.

In this embodiment, the second short-circuit plate 30b includes a bolt 30c, a ring terminal 30d, and a nut 30e.

The bolt 30c is partially buried or embedded in an insulator 13b by insert molding to be fixed to the case 13, but the bolt 30c is not limited thereto.

The insulator 13b is on or formed on the case 13.

In this embodiment, the insulator 13b may be formed such that it is fixed to the case 13 by a fixing tab 13c that protrudes from the case 13.

In some embodiments, the ring terminal 30d is combined with or combined to the bolt 30c, and is electrically coupled or connected, through a wire compressively coupled to or connected to its end portion, to the other end of the pack fuse 20.

The nut 30e is combined with or combined to the bolt 30c so as to fix the ring terminal 30d (e.g., to fix the ring terminal 30d to the bolt 30c).

When the battery module 10 is abnormally overcharged, the first connector 30 having the configuration described above is expanded by the internal pressure of the unit cell to inversely deform the first short-circuit plate 30a.

For example, when the first short-circuit plate 30a deforms due to the internal pressure of the unit cell, the first short-circuit plate 30a may have a shape illustrated by a dotted line in FIG. 3.

As a result, the first short-circuit plate 30a physically contacts or electrically contacts the bolt 30c, and the positive terminal 15 of the first unit cell C1 is electrically coupled to or connected to the other end of the pack fuse 20 through the wire of the ring terminal 30d.

Meanwhile, since the second connector 40 according to the exemplary embodiment has the same or substantially the same configuration as the first connector 30, a detailed description and illustration thereof is the same or substantially the same as that of the first connector 30 and, therefore, the detailed description and illustration will not be repeated here.

Figure 4:
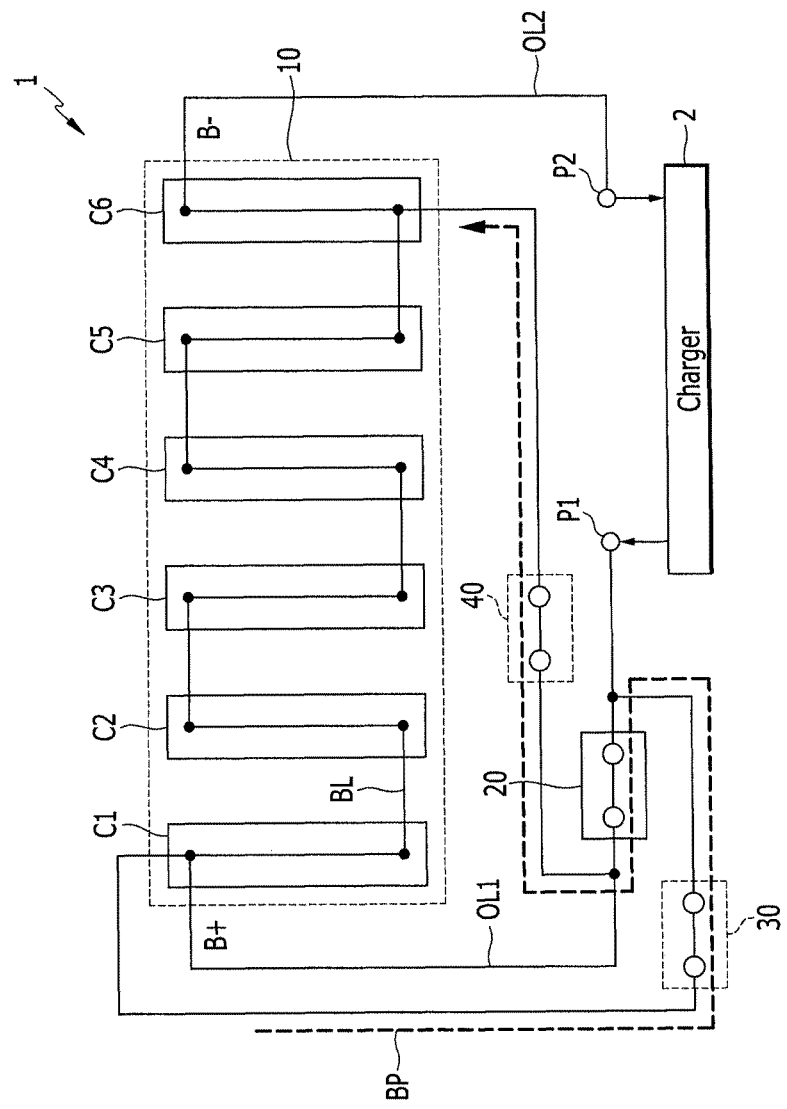
FIGS. 4 and 5 are circuit diagrams showing a driving mechanism of an embodiment of the rechargeable battery protection apparatus.
Figure 5:
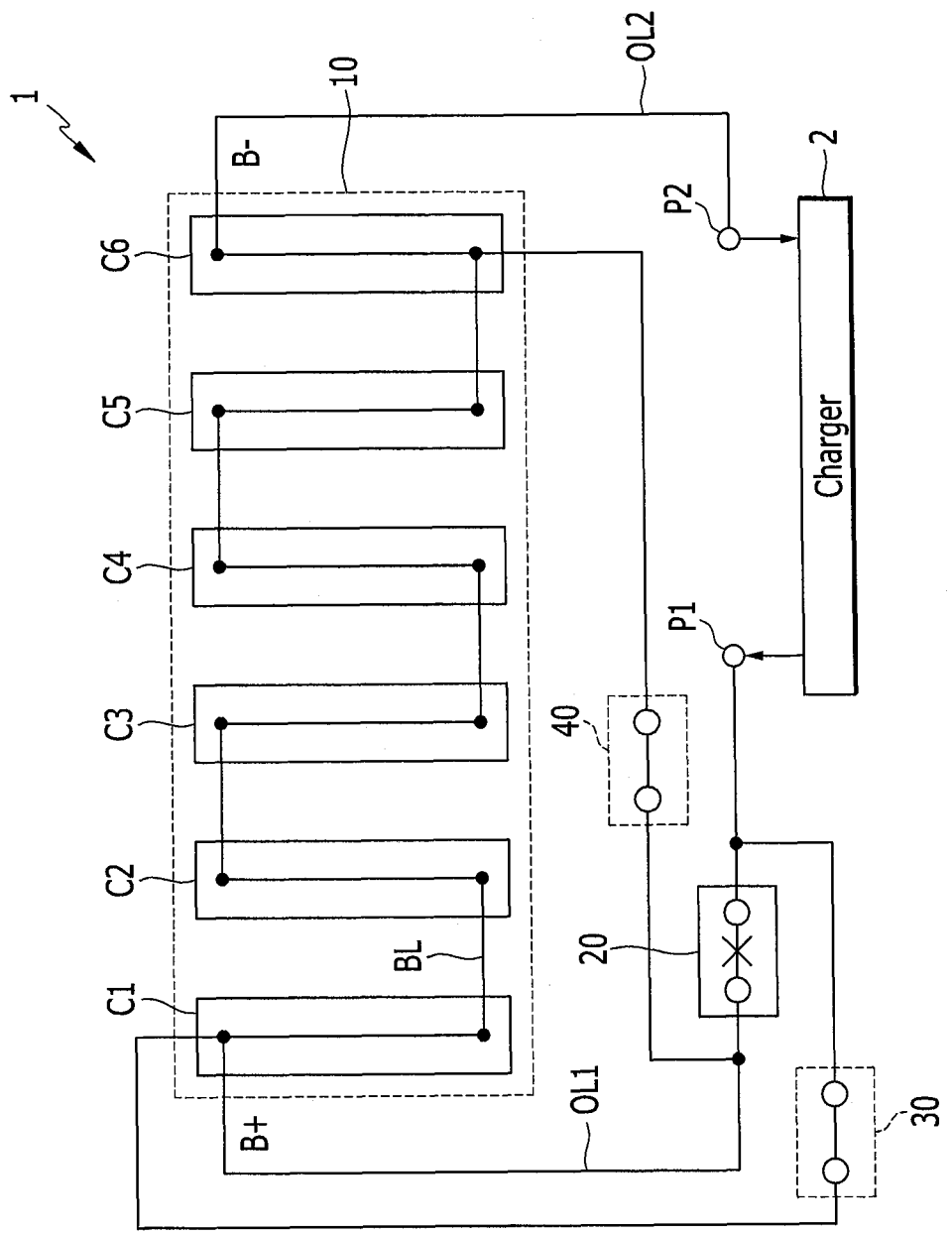

FIGS. 4 and 5 are circuit diagrams showing a driving mechanism of an embodiment of the rechargeable battery protection apparatus, and illustrating a state in which the battery module 10 is abnormally overcharged.

Referring to FIG. 4, the battery module 10 is coupled to or connected to the charger 2 and is then charged.

In this embodiment, when the battery module 10 is abnormally overcharged and the internal pressure of a unit cell (e.g., a unit cell of the first to sixth unit cells C1 to C6) increases (e.g., increase above a set pressure), the first and second connectors 30 and 40 are physically deformed to form respective electrical connections (e.g., electrical conductive wires).

Next, the positive terminal of the first unit cell C1 is electrically coupled to or connected to the other end of the pack fuse 20 through the first connector 30, and the positive terminal of the sixth unit cell C6 is electrically coupled to or connected to the one end of the pack fuse 20 through the second connector 40.

Thus, when the first and second connectors 30 and 40 are physically deformed to form respective electrical connections, the positive terminal of the first unit cell C1 is short-circuited with the negative terminal of the fifth unit cell C5.

For example, when the first and second connectors 30 and 40 are physically deformed to form respective electrical connections, a bypass path BP is formed to bypass a current flowing through the first to fifth unit cells C1 to C5 to the pack fuse 20 through the first and second connectors 30 and 40.

Next, the short-circuit current flows through the positive terminal of the first unit cell C1, the pack fuse 20, and the negative terminal of the fifth unit cell C5, and the pack fuse 20 is melted and cut off (e.g., disconnected) by the short-circuit current, as shown in FIG. 5.

Thus, the high current path between the battery module 10 and the charger 2 is cut off (e.g., disconnected) to stop charging of the battery module 10.

For example, in the exemplary embodiment, in an abnormal condition under which a battery management system (BMS) alone cannot, or does not suitably, control overcharge, the short-circuit current corresponding to a voltage difference between the unit cell C1 at the highest voltage side and the unit cell C6 at the lowest voltage side is induced by the physical deformation of the first and second connectors 30 and 40.

Thus, an electrical connection between the battery module 10 and the charger 2 is disconnected, so the battery module 10 may be prevented from being abnormally overcharged (or a likelihood or amount of such abnormal overcharge may be reduced).

In addition, in order to prevent or reduce the overcharge in general, when a current interruption device (CID) is used to cut off each current path of a plurality of unit cells or an overcharge safety device (OSD) is used to form a conductive wire or electrical connection that bypasses the current path, a number of parts of the unit cells is increased and, thus, robustness is vulnerable or reduced.

In addition, when the OSD is applied to the unit cell, a high current must be induced to melt and cut off an additional fuse that is installed in each unit cell, so performance deterioration occurs due to trade-offs between the OSD and the fuse.

In the exemplary embodiment, since the conductive wires or electrical connections are included in or formed from the two unit cells C1 and C6 inside the battery module 10, design margin and robustness of the unit cell can be secured and mechanical/structural interference with other systems does not occur (or is less likely to occur).

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

Description of Some of the Symbols

10: battery module
20: pack fuse
30: first connector
40: second connector

What is claimed is:

1. A rechargeable battery protection apparatus comprising:
a battery module comprising a plurality of unit cells coupled in series between a positive terminal and a negative terminal, and configured to be coupled to a charger through a first external port coupled to the positive terminal and through a second external port coupled to the negative terminal to charge the plurality of unit cells;
a pack fuse on a high current path between the battery module and the charger; and
a connector that forms a bypass path that bypasses a current between a first unit cell and a second unit cell among the plurality of unit cells to the pack fuse depending on an internal pressure of the battery module,
wherein the connector comprises a first connector and a second connector, the first connector being between the positive terminal and the pack fuse, and the second connector being between the negative terminal and the pack fuse, and
wherein the first connector is on the first unit cell and is configured to electrically couple the first unit cell and one end of the pack fuse depending on the internal pressure of the first unit cell, and the second connector is on the second unit cell and is configured to electrically couple the other end of the pack fuse and the second unit cell depending on the internal pressure of the second unit cell.

2. The apparatus of claim 1, wherein the connector is physically deformed depending on the internal pressure of the battery module to form an electrical connection between each of the first and second unit cells and the pack fuse.

3. The apparatus of claim 1, wherein each of the plurality of unit cells comprises an electrode assembly comprising positive and negative electrode plates, and a case for accommodating the electrode assembly.

4. The apparatus of claim 3, wherein the first unit cell comprises a connecting tab for electrically coupling the case of the first unit cell and the positive terminal, and the second unit cell comprises a connecting tab for electrically coupling the case of the second unit cell and a positive terminal of the second unit cell.

5. The apparatus of claim 3, wherein each of the first and second connectors comprises a first short-circuit plate that extends convexly toward the inside of the respective case, and a second short-circuit plate that is on the first short-circuit plate and is spaced apart from the first short-circuit plate.

6. The apparatus of claim 5, wherein the first short-circuit plate is deformed depending on the internal pressure to electrically contact the second short-circuit plate.

7. The apparatus of claim 1, wherein the pack fuse is between the positive terminal and the first external port.

\* \* \* \* \*